May 20, 1952  B. T. MATTHIAS  2,597,589
ELECTROOPTICAL DEVICE
Filed April 8, 1949
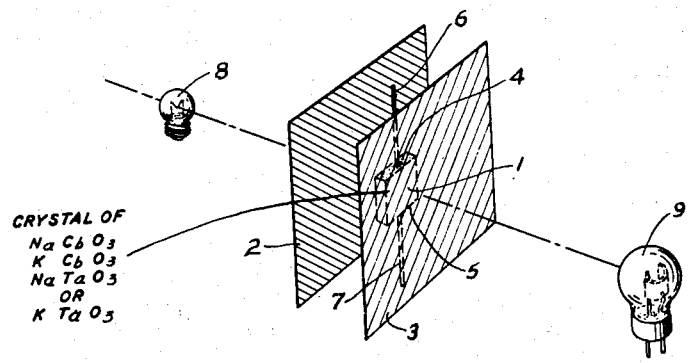
CRYSTAL OF
Na Cb O₃
K Cb O₃
Na Ta O₃
OR
K Ta O₃
INVENTOR
B. T. MATTHIAS
BY Edwin B. Cave
ATTORNEY Patented May 20, 1952

2,597,589

UNITED STATES PATENT OFFICE 2,597,589

ELECTROOPTICAL DEVICE

Bernd T. Matthias, Summit, N. J., assignor to Bell Telephone Laboratories, Incorporated, New York, N. Y., a corporation of New York Application April 8, 1949, Serial No. 86,176

2 Claims. (Cl. 88—61)

This invention relates to electro-optical devices and more particularly to electro-optical devices which operate by the rotation of the plane of polarized light in a transparent crystal when an electrical potential is applied across the crystal.

The invention is based upon the discovery that crystals of substances of the formula $ABO_3$, where A is sodium or potassium and B is a columbium or tantalum, possess to a marked degree this property of rotating the plane of polarized light under electrical stress. The invention resides in the utilization of such crystals of sodium, columbate ($NaCbO_3$), potassium columbate ($KCbO_3$), sodium tantalate ($NaTaO_3$), and potassium tantalate ($KTaO_3$) in electro-optical devices. Such a device is shown in the drawing, which is a diagrammatic showing in perspective of an electro-optical device utilizing a crystal of the present invention.

In the electro-optical device shown diagrammatically in the figure, a single crystal or crystal section 1 of a ferroelectric substance of the present invention is mounted between crossed polarizing filters 2 and 3. The crystal is provided with metal electrodes 4 and 5 coated on opposite faces, to which lead wires 6 and 7 are electrically connected by any suitable means, as by soldering. A light source 8 and a photosensitive cell 9 are so disposed that the light to which the photosensitive cell is exposed is that which originates at the light source and passes successively through polarizing filter 2, crystal 1 and polarizing filter 3. Since the degree of rotation of the plane of polarized light passing through the crystal 1 is dependent upon the voltage impressed across the electrodes 4 and 5, the amount of light originating in the light source 8 and passing through the polarizing filters and crystal to the photosensitive cell 9 can be varied by varying the voltage applied to the electrodes.

The body 1 is in the form of a single crystal or a section of a single crystal. Crystals having a size of the order of 1 to 2 millimeters or somewhat larger are adequate for this purpose.

One method by which the crystals used in the electro-optical devices of the present invention have been prepared is by reacting sodium carbonate or potassium carbonate with columbium pentoxide or tantalum pentoxide in the molten state in a flux such as sodium fluoride or potassium fluoride, cooling the mass to room temperature and dissolving away the flux with water, so as to leave the substantially insoluble crystals.

Thus, crystals of sodium metacolumbate were grown by mixing stoichiometric quantities of sodium carbonate and columbium pentoxide with about 10 per cent by weight of sodium fluoride as a flux, heating the mixture to 1400° C. and then cooling it to room temperature over a period of about 2 hours. Crystals of sodium metatantalate were grown by a similar procedure except for the substitution of tantalum pentoxide for columbium pentoxide.

Similarly, crystals of potassium metacolumbate were grown by making mixtures of equal amounts of potassium carbonate, columbium pentoxide and potassium fluoride, heating for about 6 hours at 1170° C. cooling at a rate of about 10° C. per hour until the mass has cooled to about 700° C. and then cooling rapidly to room temperature. Crystals of potassium metatantalate were grown in a similar manner with the substitution of tantalum pentoxide for columbium pentoxide.

Crystals of potassium metacolumbate and potassium metatantalate were also grown by mixing stoichiometric amounts of potassium carbonate and either columbium pentoxide or tantalum pentoxide with an equal weight of a flux consisting of about four parts of potassium fluoride and one part of sodium fluoride, heating at about 1200° C. for about 3 hours and then cooling to room temperature at a rate in the vicinity of about 100° C. per hour.

Crystals were also prepared by reacting at 1200° C. a mixture having the weight proportion of one part of potassium fluoride, 2.6 parts of potassium sulfate, 1.55 parts of potassium carbonate and three parts of columbium pentoxide, cooling to about 700° C. at a rate of about 15° C. per hour and then cooling rapidly to room temperature. Potassium metatantalate crystals were prepared similarly except for the substitution of 5.4 parts by weight of tantalum pentoxide for the columbium pentoxide.

The crystals of sodium metacolumbate prepared as described above had an average size in the vicinity of 2 millimeters. Crystals of the other substances had average sizes approximating one-half millimeter or one millimeter.

It is often desirable to form these crystals of a mixture of two or more of these substances, both substances entering into the same crystal lattice. Similarly, it may also be desirable to form the crystals of a mixture of one or more of the above substances with one or more of some other substance capable of entering into the same crystal lattice, such as lanthanum gallate, lanthanum aluminate, or barium titanate.

It may also be desirable to form mixed crystals in which a small amount of lanthanum ferrate or of other rare earth metal ferrates is present. Because of the high conductivity of the ferrates, the amount added should ordinarily be limited to not more than about 10 per cent of the total substance entering into the crystal. It may also be desirable to form mixed crystals with lead titanate or any other substance having the perovskite structure.

These mixed crystals may be formed in the same manner as described above, except that stoichiometric amounts of the oxide components of the compounds to be added are incorporated in the melt along with the original components.

The devices of the present invention have been described as made up essentially of a pair of electrodes spaced by a body of a crystal containing sodium or potassium columbate or tantalate. These devices may be manufactured according to the techniques known in the art for the manufacture of analogous devices embodying other crystal bodies. The best results are obtained when the electrodes consist of an adherent conductive coating formed directly on the body, as by the application of a conventional silver paste, which is later fired to produce an adherent durable solid conductive coating, or by applying a sprayed or evaporated metal layer.

It may obviously be desirable to form the devices of the present invention with more than two electrodes in some instances.

The invention has been described above in terms of its specific embodiments and, since modifications and equivalents will be apparent to those skilled in the art, the description is intended to be illustrative of, and not a limitation upon, the scope of the invention.

What is claimed is:

1. An electro-optical device comprising a pair of spaced, crossed polarizing filters and, disposed therebetween, a crystal consisting of a substance selected from the group consisting of sodium metacolumbate, potassium metacolumbate, sodium metatantalate and potassium metatantalate, said crystal having a pair of electrodes disposed on opposite faces thereof.

2. An electro-optical device comprising a pair of spaced polarizing filters and disposed therebetween a crystal consisting essentially of at least one substance selected from the group consisting of sodium metacolumbate, potassium metacolumbate, sodium metatantalate and potassium metatantalate, said crystal having a pair of electrodes disposed on opposite surfaces thereof.

BERND T. MATTHIAS.

REFERENCES CITED

The following references are of record in the file of this patent:

UNITED STATES PATENTS

| Number | Name | Date |
|---|---|---|
| 1,694,661 | Meissner | Dec. 11, 1928 |
| 2,461,307 | Antalek | Feb. 8, 1949 |
| 2,467,325 | Mason | Apr. 12, 1949 |
| 2,493,200 | Land | Jan. 3, 1950 |